United States Patent

James

[15] 3,649,314

[45] Mar. 14, 1972

[54] REFRACTORY COMPOSITIONS CONTAINING CARBON

[72] Inventor: Derek Patrick James, Reigate, England

[73] Assignee: United States Borax & Chemical Corporation, Los Angeles, Calif.

[22] Filed: Dec. 29, 1969

[21] Appl. No.: 888,942

[30] Foreign Application Priority Data

Jan. 9, 1969 Great Britain..........................1,439/69

[52] U.S. Cl..................................106/56, 106/43, 106/57, 106/65, 106/66, 252/504, 252/506, 252/507, 252/508
[51] Int. Cl.....................................C04b 35/52, C04b 35/58
[58] Field of Search......................106/43, 55, 56, 57, 65, 66; 252/504, 506–508

[56] References Cited

UNITED STATES PATENTS

| | | | |
|---|---|---|---|
| 2,814,566 | 11/1957 | Glaser | 106/43 |
| 2,839,413 | 6/1958 | Taylor | 106/65 |
| 3,251,700 | 5/1966 | Mandorf | 106/65 |
| 3,256,103 | 6/1966 | Roche et al. | 106/55 |
| 3,408,312 | 10/1968 | Richards | 106/55 |
| 3,514,271 | 5/1970 | Yates | 106/55 |

*Primary Examiner*—James E. Poer
*Attorney*—James R. Thornton

[57] ABSTRACT

Refractory compositions based on aluminum nitride, boron nitride, and at least one refractory boride, nitride, carbide or silicide. A small amount of carbon, such as about 0.5 to 3 percent by weight, is added to the composition before hot-pressing. The resultant hot-pressed bodies have improved properties especially in the length of their life when used as aluminum-vaporizing crucibles.

9 Claims, No Drawings

REFRACTORY COMPOSITIONS CONTAINING CARBON

This invention relates to refractory compositions having particular utility for making crucibles of the type used for vaporizing aluminum, and the invention provides such compositions and provides also shaped articles such as aluminum-vaporizing crucibles made from the composition and a method of vaporizing aluminum from a crucible made of the compositions of the invention.

Aluminum-vaporizing crucibles, commonly called boats, are used in the process of depositing a thin film of aluminum on a work surface, in which process a rod or wire of aluminum is passed continuously onto the vaporizing surface of the boat which is resistance-heated by passage of an electric current therethrough so as to vaporize the aluminum under partial vacuum, the aluminum vapor then being condensed onto the work surface to form the desired film.

According to the present invention there is provided an improvement in refractory compositions comprising approximately equal parts of two components e.g., from 40 to 60 percent of either component) of which the first component is a mixture of aluminum nitride and boron nitride (the aluminum nitride being the major part of the first component and preferably comprising 60–80 percent thereof) while the second component is at least one boride, nitride, carbide or silicide of a metal such that the compound is within the class of substances known as refractory hard metals. The improvement comprises the incorporation, as a third component of from 0.5 to about 3% by weight of the total composition of carbon or of a substance which can be heated to provide carbon.

By the term "refractory hard metals" we mean in the first place the borides, carbides, nitrides, and silicides of titanium or zirconium and also the other metals such as tungsten, hafnium, molybdenum, tantalum, vanadium, niobium, and chromium which are commonly called refractory metals. However, chromium nitride is unsuitable and is, therefore, excluded.

The second component is preferably titanium diboride or zirconium diboride or a mixture thereof. The third component can be included in the mixture in the form of graphite or lampblack. However, finely divided graphite is preferred. Alternatively, the third component may be present by inclusion of carbonaceous resin, such as furane, such that when the mixture is hot pressed or sintered the resin is converted to carbon.

The invention provides also a method of making refractory articles which comprise subjecting a composition of the invention to pressure and to heat, preferably simultaneously as in hot pressing. One advantageous method of operating according to the invention is to cold-press the composition to desired shape, coat the shapes with boron nitride to prevent their sticking together and then hot-press a number of the shapes together. As a result of the hot pressing to form the sintered body, the carbon appears to react with the other components, such as boron nitride to form some boron carbide.

A typical composition according to the invention has the following components (by weight):

| | |
|---|---|
| aluminum nitride | 33% |
| boron nitride | 15% |
| titanium diboride | 50% |
| graphite | 2% |

This composition is made by adding to each other the requisite amounts of the four ingredients in fine powder form and intimately dispersing the powders to form a fine grey powder. The powder composition can be fabricated by hot pressing into blocks. Two samples of this composition were hot pressed to respectively a low density (about 90 percent of the theoretical) and a high density (more than 95 percent theoretical).

Suitable conditions for hot pressing the compositions of the invention are at a temperature of about 1,800° C. and a pressure of about 2,700 p.s.i.

These blocks were compared with control blocks made in identical fashion from a composition containing the same proportions of aluminum nitride, boron nitride and titanium diboride but containing no carbon. The blocks were compared for their length of life (in hours) when used as an aluminum-vaporizing crucible, for their machinability, for the ease with which the composition can be pressed, and for their electrical properties. Results were as follows:

| | | High Density | Low density |
|---|---|---|---|
| Life | with carbon | 33 | 33 |
| Life | without carbon | 29 | 17 |
| Electrical properties | with carbon | good | poor |
| Electrical properties | without carbon | poor | poor |
| Machinability | with carbon | more difficult | easy |
| Machinability | without carbon | difficult | easy |
| Pressing | with carbon | fair | good |
| Pressing | without carbon | not so fair | good |

It is apparent that the advantage of the presence of carbon is the long life given to the blocks, especially when the blocks are of low density which facilitates machining.

A boat or crucible of this invention may consist of an elongated bar of flat cross section having a cavity machined out along one face thereof and in use is clamped at respective ends between two electrical contacts and electric current is passed between the contacts through the boat while aluminum is fed into the cavity and vaporized therefrom, the operation being effected under vacuum of $1 \times 10^{-3}$ to $5 \times 10^{-3}$ torr.

Various changes and modifications of the invention can be made and, to the extent that such variations incorporate the spirit of this invention, they are intended to be included within the scope of the appended claims.

What is claimed is:

1. A refractory composition consisting essentially of about equal parts by weight of
   a. a mixture of about 60–80 percent of aluminum nitride and about 20–40 percent of boron nitride, and
   b. at least one refractory hard metal selected from the refractory borides, nitrides, carbides and silicides,
   and about 0.5 to 3 percent by weight of carbon.

2. A refractory composition according to claim 1 in which b) is selected from the group consisting of titanium diboride, zirconium diboride, and mixtures thereof.

3. A refractory composition according to claim 1 which has the composition, by weight,
   33% aluminum nitride
   15% boron nitride
   50% titanium diboride
   2% graphite 4. A refractory composition according to claim 1 in which b) is a refractory boride.

5. A refractory composition according to claim 1 in which said carbon is graphite.

6. In the method for forming a sintered refractory body by forming an admixture of about equal parts by weight of
   a. a mixture of about 60–80 percent of aluminum nitride and about 20–40 percent of boron nitride, and
   b. at least one refractory hard metal selected from the refractory borides, nitrides, carbides and silicides,
   and hot-pressing said admixture to provide a sintered body, the improvement which consists of incorporating in said admixture about 0.5 to 3 percent by weight of a member of the group consisting of carbon and resins convertible to said amount of carbon upon heating.

7. The method according to claim 6 in which b) is selected from the group consisting of titanium diboride, zirconium diboride, and mixtures thereof.

8. The method according to claim 6 in which said carbon is graphite.

9. A sintered refractory composition in the shape of a crucible adapted for vaporization of aluminum consisting essentially of
   33% aluminum nitride 15% boron nitride
50% titanium diboride
2% carbon,
said percentages by weight.

* * * * *